United States Patent
Golz et al.

[11] Patent Number: 5,859,405
[45] Date of Patent: Jan. 12, 1999

[54] CUTTING TOOL PRECISION TURNING METHOD AND APPARATUS FOR A HEAT-TREATABLE STEEL WORKPIECE

[75] Inventors: Ulrich Golz, Nersingen; Peter Linden, Beimerstetten; Xiaoyi Liu, Ulm; Matthias Merkel, Iffezheim; Peter Mueller-Hummel, Elchingen-Thalfingen, all of Germany

[73] Assignee: Daimler-Benz AG, Germany

[21] Appl. No.: 829,926

[22] Filed: Apr. 1, 1997

[30] Foreign Application Priority Data

Apr. 2, 1996 [DE] Germany .................. 196 13 183.9

[51] Int. Cl.$^6$ ................................................ B23K 26/08
[52] U.S. Cl. ........................... 219/121.67; 219/121.6; 219/121.72; 219/121.83; 219/121.85; 82/51; 407/1; 148/565
[58] Field of Search ............ 219/121.6, 121.62, 219/121.68, 121.69, 121.65, 121.66, 121.67, 121.72, 121.83, 121.85; 408/16, 701; 148/565, 525; 407/1, 120; 409/136; 82/1.11, 51, 900

[56] References Cited

U.S. PATENT DOCUMENTS

| | | | |
|---|---|---|---|
| 3,579,775 | 5/1971 | Carlson | 407/120 X |
| 4,170,726 | 10/1979 | Okuda | 219/121.69 |
| 4,229,640 | 10/1980 | Castellani Longo . | |
| 4,273,127 | 6/1981 | Auth et al. | 219/121.6 X |
| 4,352,973 | 10/1982 | Chase | 219/121.68 |
| 4,356,376 | 10/1982 | Komanduri et al. | 219/121.72 |
| 4,420,253 | 12/1983 | Pryor | 408/16 X |
| 4,459,458 | 7/1984 | Vetsch et al. | 219/121.6 |
| 4,676,586 | 6/1987 | Jones et al. . | |
| 4,681,396 | 7/1987 | Jones . | |
| 4,799,755 | 1/1989 | Jones . | |
| 4,980,534 | 12/1990 | Okamoto et al. | 219/121.6 |
| 5,065,515 | 11/1991 | Iderosa | 30/140 |
| 5,409,376 | 4/1995 | Murphy | 408/701 X |

FOREIGN PATENT DOCUMENTS

| | | | |
|---|---|---|---|
| 2662383 | 11/1991 | France | 219/121.67 |
| 254 348 A1 | 2/1988 | Germany . | |
| 42 33 035 C1 | 7/1993 | Germany . | |
| 5754001 | 3/1982 | Japan | 219/121.67 |
| 57-205001 | 12/1982 | Japan | 219/121.67 |
| 59-085393 | 5/1984 | Japan | 219/121.67 |
| 62-152601 | 7/1987 | Japan | 219/121.72 |
| 2-241688 | 9/1990 | Japan | 219/121.72 |
| 2 012 646 | 8/1979 | United Kingdom . | |

OTHER PUBLICATIONS

Revolution in der Fertigungstechnik, Barbara Wantzen, Transfer, Nr. 9, 1994, pp. 14–16.

*Primary Examiner*—Gregory L. Mills
*Attorney, Agent, or Firm*—Evenson, McKeown, Edwards & Lenahan, P.L.L.C.

[57] ABSTRACT

A method and a device for the precision turning of a workpiece made of a heat-treatable steel permits a dry hard precision turning of hardened workpiece surfaces without tempering. In order also to allow precision turning and hardening of unhardened workpiece surfaces which are simultaneous in terms of production time, use is made of the local temporary heating of the workpiece caused by machining. The workpiece surface is heated further locally by the action of a laser beam, in the region directly behind the cutter, up to the transformation temperature of the material to be machined via an optical fiber integrated in the tool. The surface is then self-quenched and, as a result, hardened close to the surface. At the same time, the surface temperature at the point of action of the laser beam can be recorded thermographically and, this actual temperature signal can be used to adjust the power of the laser beam so as to maintain the desired temperature.

4 Claims, 1 Drawing Sheet

CUTTING TOOL PRECISION TURNING METHOD AND APPARATUS FOR A HEAT-TREATABLE STEEL WORKPIECE

BACKGROUND AND SUMMARY OF THE INVENTION

This application claims the priority of 196 13 183.9, the disclosure of which is expressly incorporated by reference herein.

The present invention relates to a method and a device for the precision turning of a workpiece made of a heat-treatable steel by way of a cutting tool.

Due to the hard cutting materials which are currently available for machining materials, extremely hard workpiece materials can sometimes be machined by turning and, in the case of unhardened materials, very high cutting speeds may be achieved. When precision turning workpieces, in many cases in contrast to grinding, coolants can be dispensed with, while nevertheless maintaining the required high surface qualities. From an energy point of view also, precision turning has advantages compared to grinding, owing to the defined tool geometry. Due to the abovementioned highly loadable cutting materials, there is now also a tendency to precision-turn workpieces in the region of hardened surface parts, i.e. so-called hard precision turning.

A drawback of precision machining of hardened workpiece surfaces, whether by grinding or by precision turning, is that as a result, owing to the machining, a certain amount of heat is introduced relatively rapidly into the workpiece. This heat has to be continuously removed again to the outside by a substantial supply of cooling liquid, in order to avoid an uncontrolled, thermally caused microstructural change in the hardened layers of material situated close to the surface. If an external cooling were dispensed with, the introduction of heat, caused by machining, into the workpiece surface would lead to a build-up of heat close to the surface and thus to an uncontrolled tempering, which reduces the desired surface hardness.

A drawback of external cooling is that considerable outlay is required in order to maintain such a cooling liquid circulation and to regenerate the circulated cooling liquid, for which reason it would be desirable to do without cooling liquid. In addition, some of the additives in the cooling liquids which are provided with various additives evaporate. In some cases, this evaporation can affect the health of the people in the work area.

An object of the present invention is to improve the basic precision turning method or the corresponding device. That is, on one hand, when precision turning hardened workpiece surfaces, there is no need to cool the machining operation by cooling liquid. The above-mentioned tempering is nevertheless avoided, or such that, on the other hand, when precision turning surfaces, which are as yet unhardened but are to be hardened, of a heat-treatable steel workpieces, there is no need for a separate heat treatment.

Starting from the basic method or the corresponding device, this object has been achieved according to the present invention by using the precision turning to cause temporary heating of a part situated close to a surface of the workpiece and locally delimited close to an immediate vicinity of a cutter of the turning tool, (b) heating the surface locally, in a region directly behind a point of action of the cutter by a laser beam, (c) moving the laser beam together with the turning tool, (d) supplying the laser beam to the point of action via a glass fiber through a passage integrated in the turning tool, (e) dimensioning the power density at the point of action of the laser beam, which is directed onto workpiece surface such that, taking into account a relative speed between the laser beam and the surface, material close to the surface is temporarily heated to the transformation temperature of the material to be machined, (f) self-quenching the material by cold volumes of the material which are situated more deeply in the workpiece with consequent hardening of the workpiece close to the surface; and (g) selecting the rotational speed of the workpiece during the precision turning so that the rotation time of the workpiece is shorter than the time for the self-quenching of workpiece parts which are heated to the transformation temperature.

Moreover, the turning tool of the present invention is provided with an integrated passage with an opening on a workpiece side, and at least one glass fiber being arranged in the passage, such that, a laser beam can be supplied through the passage, to a surface below the cutting edge of the turning tool at a distance of about 2 to 3 mm beneath the cutter, whereby with the laser beam power dimensioned such that, taking into account a relative speed between the laser beam and a workpiece surface, the material can be temporarily heated close to the surface to the transformation temperature of the material to be machined.

With the method and device of the present invention, the introduction of heat over a small area, which is caused by machining and endures only for a very short time, is utilized and built on to increase the introduction of heat by the action of a laser beam up to the transformation temperature. Then, due to a self-quenching, an ordered and defined hardening structure is formed. When precision turning workpiece parts which have already been hardened, the tempering action of the introduction of heat caused by machining is compensated for by the heat treatment according to the present invention, and when precision turning surface parts which have not yet been hardened but are to be hardened, the machined surface is simultaneously also hardened during the machining time.

Surfaces of parts to be turned, which surfaces do not need to be machined, can also be hardened by taking the cutting tool out of action there but guiding it along at a short distance from the surface to be hardened, with the laser beam switched on and the workpiece rotating.

Furthermore, it is also possible locally to harden only partially the workpiece surface over which the tool moves, whether removing metal or otherwise, by interrupting the laser beam. Specifically, it is possible in this manner not only to interrupt the hardening zone axially, but also certain peripheral regions can be left out during hardening in a targeted manner by an interruption of the beam which is rotationally synchronous and dependent on the angle of rotation.

Although DE 42 33 035 C1 describes integration of an observation window in a machining tool, which window, depending on the machine tool application, can be arranged on the tool face or on the surface below the cutting edge, this window is only intended to capture and evaluate by thermography a thermal radiation emitted by the workpiece at the machining point.

Furthermore, the simultaneous use of a laser beam at the machining point is known, for example, in turning (U.S. Pat. No. 4,229,640 or B. Wantzen: "Revolution in der Fertigungstechnik—Laserunterstutzte Warmzerspanung verhilft neuen Werkstoffen zum Durchbruch" [translation: Revolution in production technology—laser-assisted thermal machining helps new materials along to breakthrough], in the "Transfer", No. 9, 1994, pages 14–16). In this latter document, directly preceding the machining point and at a constant relative position with respect thereto, a laser beam is guided onto the outside of the as yet unmachined workpiece surface, to a certain degree into the chip root. As a result, the material is softened so that it can be machined with less resistance.

With the simultaneous use of a laser beam during machining, as shown in DD 254 348 A1, the laser beam is directed onto the outside of the already removed chip in the region of the face of the tool. The laser beam is a pulsed beam, whose point of action covers the entire cross-section of the chip and whose energy density is so high that the chip material vaporizes at the point of action during the short period of action. Consequently, the chip, which is removed from the workpiece in a continuous piece, is comminuted into short portions, to a certain extent granulated, so that it can flow and the machine can easily be kept clean. Thereby accumulations of chips cannot form, and obstructions or even blocking cannot result.

In the known laser devices described above, the laser beam was guided freely or in a rectilinear tube body and was deflected via mirrors. It is also known to guide high-energy laser beams to their point of action in flexible glass fibers as seen, for example, in U.S. Pat. Nos. 4,676,586; 4,799,755; and 4,681,396. None of the known devices or methods, either individually or when considered together, provide any indications for the person skilled in the art in the direction of precision turning hardened workpiece surfaces while obviating the need for cooling liquid.

The advantages of the method and device according to the present invention include:

Avoidance of an uncontrolled tempering during dry hard precision turning.

Time-saving surface hardening of the workpieces simultaneously with the finishing or precision machining.

Avoidance of hardening distortions and of resulting reworking, such as grinding or hard precision turning.

Simple local hardening of certain locally limited surface parts by switching the laser beam on or off during the rotation of the workpiece.

Hardness "ramps", that is to say progressive transitions from hard to unhardened material, can also be realized in a simple manner.

Interference-free supply of the laser beam to the moveable point of action of the machining tool; specifically, the laser beam is not affected by parts of the machine and, conversely, the operation of the machine is not impaired by the beam-guiding elements.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
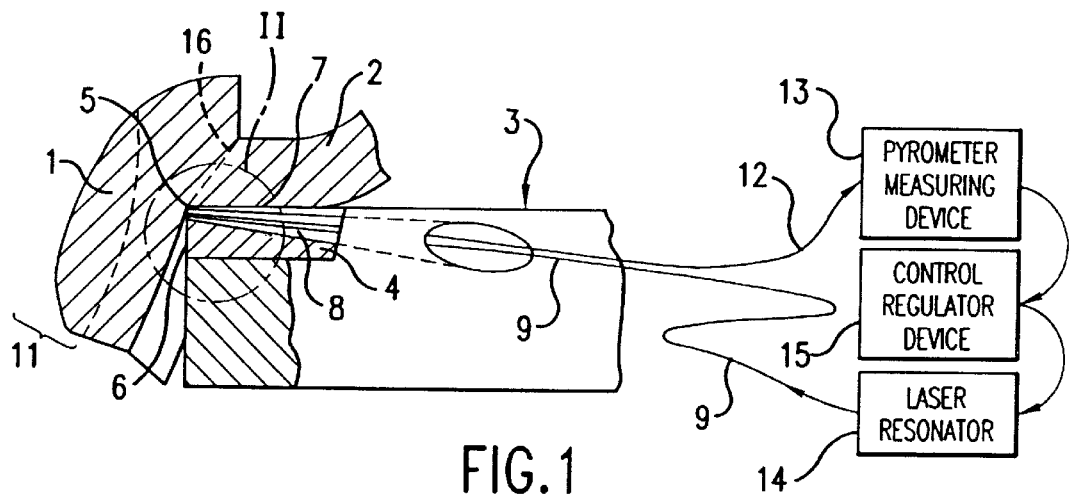
FIG. 1 is a schematic view of a precision-turning operation with simultaneous laser heat treatment of the workpiece surface, utilizing the temporary heating, caused by machining, of the workpiece surface directly behind the tool cutter.
Figure 2:
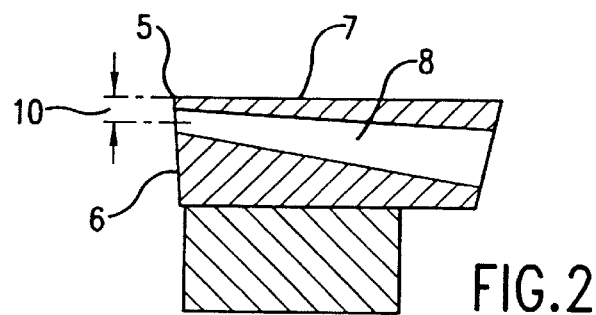
FIG. 2 is an enlarged and isolated detail view of the tool cutter in the area of dot-dash circle II in FIG. 1.

FIG. 1 illustrates the action of the cutting tool 3 with its cutter 5 during the precision turning of a heat-treatable steel workpiece 1, with a chip 2 being pared off. The cutter 5 is formed on a throw-away cutting tool tip 4 between the surface 6 below the cutting edge, facing the workpiece 1, and the tool face 7, along which the removed chip 2 slides. A passage 8, which opens out in the surface 6 below the cutting edge, about 2 to 3 mm (dimension 10 in FIG. 2) beneath the cutter 5, is integrated in the cutting tool 3 and also in the throw-away cutting tool tip 4. If thinner throw-away cutting tool tips than those in the example shown are used, specifically those which are thinner than the dimension 10, then there is no need to arrange a passage 8 in the throw-away cutting tool tip.

A glass fiber 9 runs in the passage integrated in the tool. This glass fiber is guided, outside the cutting tool 3, to a laser resonator 14 from which a laser beam generated thereby can be supplied to the workpiece 1. A further optical fiber 12 is arranged in the passage integrated in the tool and is guided to a pyrometer measuring device 13, i.e. a device which measures the integrated thermal radiation within the spot recorded.

In a more complicated arrangement, it is also within the scope of the present invention, to provide a thermography device so that an image of the local distribution of the thermal radiation inside the region recorded can be determined.

Using the foregoing arrangements, the temperature generated on the workpiece surface can be monitored without inertia. The laser resonator 14, which generates the laser beam, can be controlled by the pyrometer measuring device 13, indirectly via a control and regulating device 15. Due to the integration of the beam guidance in the machining tool by glass fibers 9, 12, the beam is not affected by the machining operation, e.g. flying chips or the like, and also the beam-guidance parts do not impede the operation of the machine.

During the machining operation, owing to the high internal friction in the region of the shearing plane 16 shown by dotted line in FIG. 1, a substantial amount of heat is generated in the chip root which, due to thermal conduction, is partly also introduced into the workpiece. However, only a workpiece part which is situated close to the surface and is delimited locally close to the direct vicinity of the cutter 5 is heated, and even this occurs only for a very short time, i.e. temporarily. Normally, this local "flash temperature" is dissipated into more deeply situated cold material layers 11. Taking the rotational speed of the workpiece into account, the surface temperature has already fallen off very considerably even after about 4 to 5 mm distance from the cutter 5.

To avoid tempering when precision turning hardened workpiece surfaces, on one hand even without external cooling or to make a separate hardening operation unnecessary, on the other hand, when precision turning surfaces which are as yet unhardened but are to be hardened, the surface is heated further locally, utilizing the still high temporary heating, caused by machining, of the surface. Specifically, the glass fiber 9 supplies a laser beam to the workpiece surface in the region directly behind the point of action of the cutting tool cutter.

The power density at the point of action of laser beam, which is directed onto the workpiece surface, is of a magnitude such that, taking into account the relative speed between the laser beam and the workpiece surface, the material is temporarily heated close to the surface to the transformation temperature of the material to be machined. Only then is the heated material self-quenched by cold volumes 11 of more deeply situated material, and as a result the workpiece is hardened close to the surface.

The rotational speed of the workpiece in the above operation is selected such that the rotation time of the workpiece is shorter than the time for the self-quenching of those parts of the workpiece which are heated close to the surface to the transformation temperature. Consequently, a heating zone, which is close to the surface and is closed in terms of area, is provided in the region of the cutter's point of action.

Via the further glass fiber cable 12, the surface temperature at the laser beam point of action is simultaneously recorded thermographically, free from inertia. This actual temperature signal allows the power of the laser beam to be adjusted to maintain the desired temperature. For this purpose, the control and regulating device 15 is connected to the thermography device 13, and automatically adjusts the laser resonator 14 to maintain the desired surface temperature which is set at the device 15 and is brought about by the laser beam.

The precision turning according to the present invention, with a laser heat treatment which is simultaneous in terms of production time, makes possible not only the hardening of machined workpiece surfaces but also of surfaces which are not to be machined. That is, in these latter surfaces the machining tool is in these areas brought out of engagement but is guided along at a close distance to the surface to be hardened. Furthermore, the present invention allows locally hardening only partially of the workpiece surface covered by interrupting the laser beam. Specifically, not only the hardening zone can be interrupted axially, but also certain peripheral regions can be left out during hardening in a targeted manner by a beam interruption which is rotationally synchronous and dependent on the rotation angle.

Figure 3:
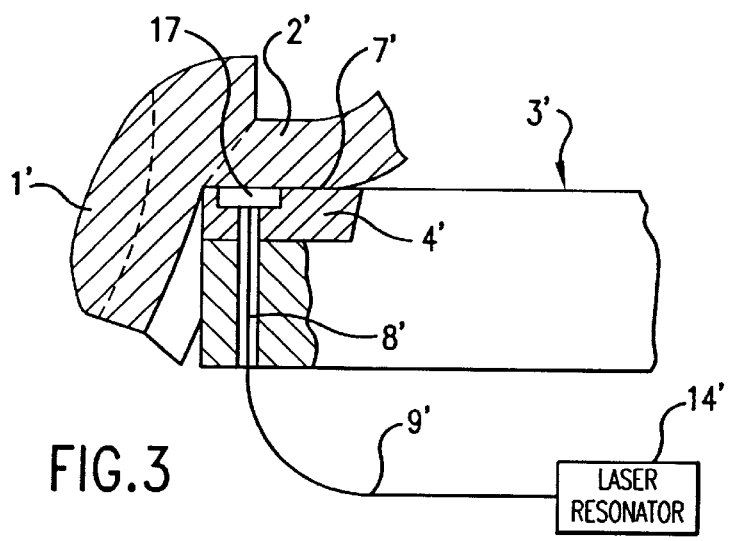
FIG. 3 is a schematic illustration similar to FIG. 1 but of a modification of the simultaneous laser heat treatment during turning for the purpose of chip breaking.

In the embodiment shown in FIG. 3, a cutting tool 3' likewise acts with its cutter, formed on a throw-away cutting tool tip 4', on the material during turning of a workpiece 1', a chip 2' likewise being removed. A passage 8', which opens in the tool face 7', is integrated in the cutting tool 3' and in the throw-away cutting tool tip 4'. The upper end of the passage 8', which end is situated in the throw-away cutting tool tip 4', is closed by a transparent window 17 integrated in the throw-away cutting tool tip and made, for example, of diamond. The window readily allows the laser radiation to pass therethrough.

A glass fiber 9' is laid in the passage 8' integrated in the tool 3' and is guided to a laser resonator 14' which generates a laser beam which can be supplied to the removed chip 2' and capture the entire chip cross-section. The laser beam supply is pulsed and its energy density is dimensioned to be so high that the chip is locally vaporized in the short intervals in which the beam is produced and supplied. As a result, the chip 2' which comes off the workpiece 1' continuously is continually comminuted into short pieces which can flow when in a pile. That is, the chips 2' are to a certain extent granulated.

This approach is recommended in particular for those materials and/or machining parameters which form a chip which tends to accumulate. Chip accumulations of this kind may in some cases provide considerable interference to an orderly functioning of the machine, particularly in the case of automated operation. The flowable, granulated, dry swarf is discharged easily under the force of gravity. In crucial cases, it is also possible to blow clear certain locations by way of a pulsed or intermittent supply of compressed air. It even being possible with the scope of the present invention in cases which are mounted in difficult positions to carry out, or at least assist, an orderly removal of chips by suction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for precision turning of a heat-treatable steel workpiece with a turning tool, comprising the steps of (a) precision turning the workpiece with a cutter of the turning tool and causing temporary heating of a part situated close to a surface of the workpiece and locally delimited close to an immediate vicinity of a cutter of the turning tool, (b) heating the surface locally, in a region directly behind a point of action of the cutter by a laser beam, (c) moving the laser beam together with the turning tool, (d) supplying the laser beam to the point of action via a glass fiber through a passage integrated in the turning tool, (e) dimensioning a power density at the point of action of the laser beam, which is directed onto the workpiece surface such that, taking into account a relative speed between the laser beam and the surface, material close to the surface is temporarily heated to a transformation temperature of the material to be machined, (f) self-quenching the material by cold volumes of the material which are situated more deeply in the workpiece with consequent hardening of the workpiece close to the surface; and (g) selecting a rotational speed of the workpiece during the precision turning so that a rotation time of the workpiece is shorter than a time for the self-quenching of workpiece parts which are heated to the transformation temperature.

2. The method according to claim 1, further comprising the steps of simultaneously recording surface temperature at the point of action of the laser beam pyrometrically or thermographically by a glass-fiber cable in the passage, and adjusting the power density of the laser beam via a signal representative of recorded surface temperature so as to maintain a desired temperature.

3. Turning tool system for carrying out precision turning and laser hardening for a heat-treatable steel workpiece, comprising a turning tool held relatively stationary to a workpiece which is rotated, a passage in the tool with an opening on a side of the workpiece, at least one glass fiber being arranged in the passage and a laser system, such that, a laser beam of the laser system can be supplied through the passage, to a surface of the workpiece below a cutting edge of the turning tool at a distance of about 2 to 3 mm beneath a cutter, whereby laser beam power is dimensioned such that, taking into account a relative speed between the laser beam and a workpiece surface, material close to the surface can be temporarily heated to a transformation temperature of the material to be machined.

4. The turning tool system according to claim 3, wherein a second optical fiber operatively associated with a thermography device is arranged in the passage to control a laser resonator producing the laser beam.

* * * * *